UNITED STATES PATENT OFFICE.

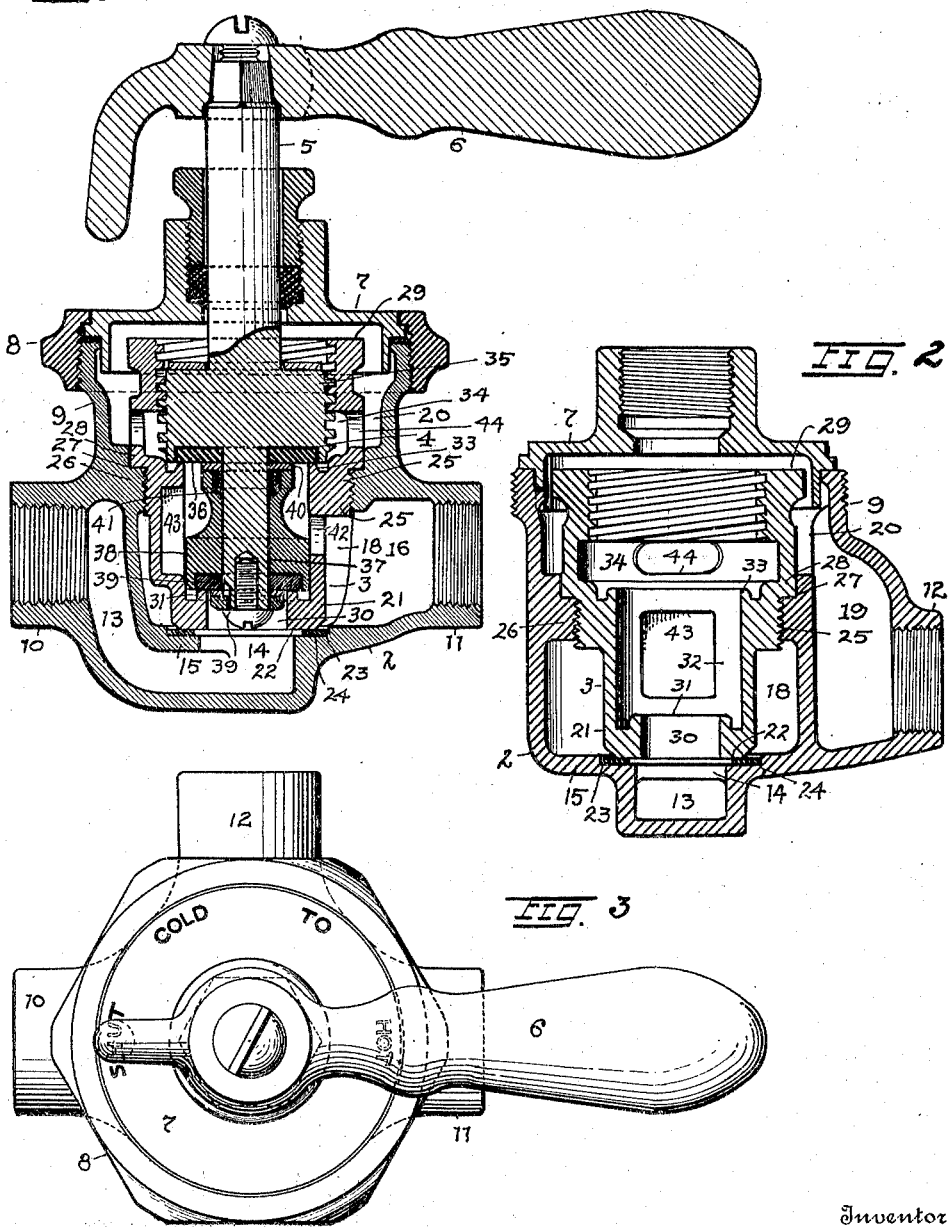

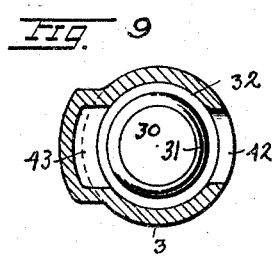
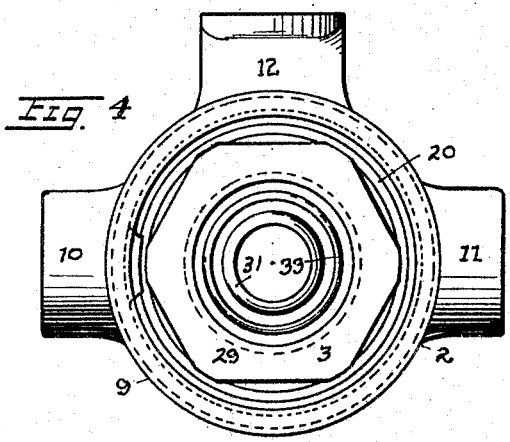
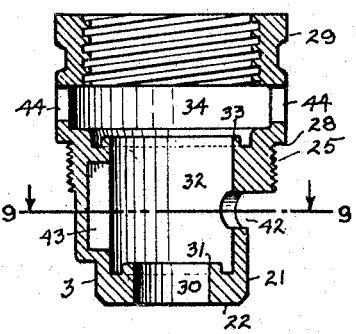
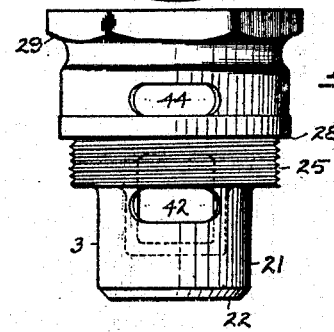
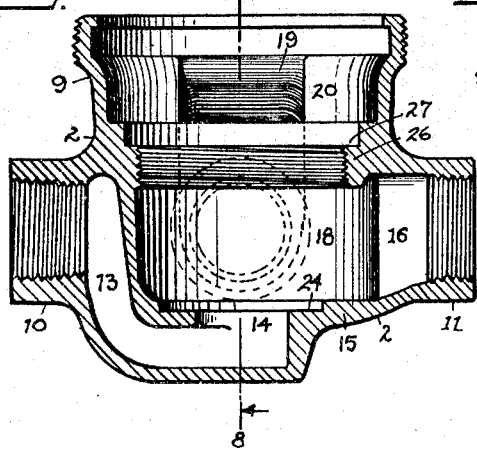
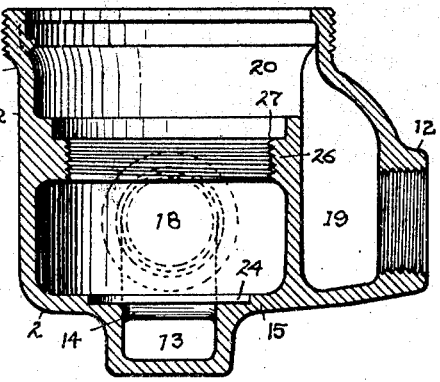

BERNARD H. JANSEN, OF CLEVELAND, OHIO, ASSIGNOR TO THE ROYAL BRASS COMPANY, OF CLEVELAND, OHIO, A CORPORATION OF OHIO.

MIXING-VALVE.

1,325,945.  Specification of Letters Patent.  Patented Dec. 23, 1919.

Application filed April 17, 1918. Serial No. 229,172.

*To all whom it may concern:*

Be it known that I, BERNARD H. JANSEN, citizen of the United States, residing at Cleveland, in the county of Cuyahoga and State of Ohio, have invented certain new and useful Improvements in Mixing-Valves, of which the following is a specification.

This invention relates to mixing valves, and more particularly to a mixing valve of the compression type having separate hot and cold water supply connections and a single delivery spout. The primary object of the invention is to provide a simple and compact compression valve for delivering either hot or cold water or a mixture of these through a delivery spout or pipe, and secondly, to provide a specially constructed body in which all of the movable valve parts are adapted to operate and be carried in a separate core or plug which may be screwed into place and removed at will. This core or plug has a central bore and screw threads to receive and engage a threaded valve stem having a plunger swiveled at its lower end, and all these internal parts are made accessible by the use of the core or plug and a removable cover plate and union nut.

In the accompanying drawings, Figure 1 is a sectional view in a vertical plane through the valve showing the intake ports. Fig. 2 is a section in the vertical plane centrally through the valve on the line of the outlet port, but with the valve removed. Fig. 3 is a plan view of the mixing valve. Fig. 4 is a plan view of the valve body with the cap and valve member removed. Fig. 5 is a section of the chambered core for the valve body, and Fig. 6 is a side view of said member. Fig. 7 is a section of the valve body on the line of the intake ports, while Fig. 8 is a similar view on line 8—8, Fig. 7, showing the outlet port. Fig. 9 is a horizontal cross section on line 9—9, Fig. 5.

In general, the mixing valve consists of a main body 2 within which a cylindrical hollow core 3 is removably seated. This core in turn seats a compression valve 4 which is controlled by a stem 5 having a handle 6 detachably affixed thereto, and the stem extends through a gland packing in a cover plate 7 which is removably secured by a union nut 8 at the outer end of a relatively large neck 9 of the body 2. This body is shown separately in Figs. 7 and 8, and comprises a round shell having three tubular bosses extending therefrom which are screw-threaded internally to receive pipes. Two of the bosses 10 and 11, respectively, are placed diametrically opposite each other, and the third boss 12 is at right angles and intermediate thereto; and all three bosses lie in the same plane. The screw-threaded entrance to each boss communicates with a separate water passage formed within body 2. Thus, a hot-water supply passage 13 of angular form is provided between boss 10 and a central opening 14 in the bottom 15 of the body, while a short cold-water supply passage 16 is formed on a direct line between boss 11 and a round and relatively large chamber 18 centrally within the body. The third passage 19 is formed vertically at one side of the body between boss 12 and the annular mixing chamber 20 within neck 9.

These separate passages are cut off from communication with each other by the core 3 and valve 4. Thus, core 3 is in the form of a hollow cylindrical plug with a reduced extension 21 having a flat end face 22 adapted to seat upon a fiber washer 23 placed within a shallow annular counter-bore 24 in bottom 15 around opening 14. Core 3 is also provided with a central screw-threaded enlargement 25 adapted to screw into the threaded opening in the middle parting wall 26 of the body 2, which wall is also provided with a shallow counter-bore and an annular seat 27 in its upper portion adapted to receive the shouldered seating portion 28 of the core. A metal-to-metal seal is thus provided at upper counter-bore 27 and a yielding or cushioned seating engagement is provided by the fiber washer 23 between the end face 22 of the core and counter-bore 24. The upper end 29 of the core is of hexagonal form and extends into the neck chamber 20 with the end thereof in approximately the same plane as the end of the neck 9, and sufficient space is provided around the hexagonal end 29 to permit wrench engagement with the core so that it may be removed and replaced readily and conveniently in the absence of a cover plate 7.

Core 3 is provided with a central valve opening 30 and valve seat 31 at one end thereof, and a cylindrical bore 32 extends through the core from seat 31 to a second and larger valve seat 33 located midway of the core at the base of a round discharge chamber 34 in the extension or end 29 of the core. This extension is screw-threaded internally to receive the screw-threaded enlargement 35 of the valve stem 5, and a fiber disk 36 is set within the lower face of enlargement 35 to engage the larger valve seat 33. A round spindle 37 extends downwardly from the center of the enlargement 35, and is integral therewith and a piston plunger 38 is swiveled on said spindle and operates in bore 32. The recessed bottom of the plunger contains a fiber washer 39 adapted to engage the lower valve seat 31, and a locking washer and screw 39 engaged with the spindle extremity holds the plunger in place with its upper end in bearing engagement with a metal washer 40. The upper end of the plunger is recessed around the spindle and supplied with packing 41 to prevent leakage,—a desirable addition in view of the constant exposure of the lower end of the spindle to the water under pressure in passage 13.

A cold water entrance 42 is provided in the side of core 3 about midlength of the plunger bore 32, and a longitudinal transfer duct 43 is also made internally of the core at one side of bore 32 intermediate the two valve seats 31 and 33, respectively. Then, one or more side openings 44 are made in the upper end 29 of the core opposite discharge chamber 34, and these openings 44 communicate with the annular mixing chamber 20 from which the water finds an outlet by way of passage 19.

The device may be installed with the handle operating in either a horizontal or vertical plane, and in operation a partial turn of the valve stem will raise the main compression valve from seat 33, thus permitting cold water to flow into the discharge chamber 34 from the bore 32 which receives the cold water through the side entrance 42. A further partial turn of the valve stem will then raise the lower end of the plunger above the lower end of the transfer duct 43 and permit intake of hot water from bottom opening 14 without cutting off the intake of cold water at the side entrance 42, thus bringing about a double flow of hot and cold water through bore 32 and the discharge and mixing chamber. Upon a further partial turn of the valve stem the plunger will cut off the cold water completely and then hot water will flow alone through the communicating channels leading to passage 19.

The advantages of a removable core 3 constructed as described and adapted to receive the valve operating parts and to be removably secured in the main body, are manifested in the manufacture of the device; in the assembly of the parts initially; in the repair and replacement of the core and valve members after use; and in the actual use of the device when installed. Furthermore, the valve as a whole is an embodiment of simplicity and compactness, with every practical surety against leakage, and responds quickly with a minimum of movement and a sensitive control.

What I claim is:

1. In hot and cold water mixing valves, a chambered body and a hollow core in screw-engagement at its middle therewith at the middle of said body, the said body and core having separate passages for the flow of hot and cold water through the same and a common outlet therefrom, and a compression valve in screw-engagement within the upper part of said core having a plunger portion adapted to control the flow of water therethrough to said outlet.

2. A hot and cold water mixing valve, comprising a chambered body having separate hot and cold water inlet passages respectively and an annular mixing space for the water and an internal parting wall below said space provided with a screw-threaded opening therein in combination with a hollow core screw-engaged with said parting wall and extending therethrough into open communication with said hot and cold water passages beneath said wall, and a valve member in said core and screw-engaged therewith and having a spindle and reciprocable within the said core for controlling the flow of water through said passages.

3. In a hot and cold water mixing valve, a main water distributing body and a removable hollow core in said body having separate end and side entrances for hot and cold water and a discharge chamber for the water with a valve seat at its base and provided with a screw threaded opening at its top and adapted to receive a compression valve.

4. In a hot and cold water mixing valve, a main water-distributing body and a hollow core having external screw-threads about its middle engaging said core within the body and provided with internal screw-threads in its upper portion and with a central bore and valve seats at opposite ends of said bore and separate hot and cold water entrances in the bottom and side thereof respectively, and a compression valve rotatably engaged in said core and adapted to close upon said valve seats.

5. In a hot and cold water mixing valve, a chambered body having a parting wall at its middle provided with a screw-threaded opening and a counterbore providing a sealing seat and provided further with a central opening and counter-bore in its bottom, and a hollow core having screw-threads and a shouldered sealing surface to engage said parting wall and provided with a bored extension having an end opening and seating extremity and a sealing washer between said extremity and bottom counterbore.

Signed at Cleveland, in the county of Cuyahoga and State of Ohio, this 10th day of April, 1918.

BERNARD H. JANSEN.